United States Patent
Horvath et al.

(10) Patent No.: US 11,460,200 B2
(45) Date of Patent: Oct. 4, 2022

(54) METHOD AND APPARATUS FOR AIR CIRCULATION AND PURIFICATION

(71) Applicants: Kenneth Horvath, Prescott, AZ (US); David Nicholas Hodge, Surprise, AZ (US)

(72) Inventors: Kenneth Horvath, Prescott, AZ (US); David Nicholas Hodge, Surprise, AZ (US)

( * ) Notice: Subject to any disclaimer, the term of this patent is extended or adjusted under 35 U.S.C. 154(b) by 95 days.

(21) Appl. No.: 16/106,428

(22) Filed: Aug. 21, 2018

(65) Prior Publication Data

US 2020/0063997 A1  Feb. 27, 2020

(51) Int. Cl.
| F24F 7/007 | (2006.01) |
| F24F 11/00 | (2018.01) |
| F24F 13/28 | (2006.01) |

(52) U.S. Cl.
CPC .......... *F24F 7/007* (2013.01); *F24F 11/0001* (2013.01); *F24F 13/28* (2013.01); *F24F 2221/46* (2013.01)

(58) Field of Classification Search
CPC combination set(s) only.
See application file for complete search history.

(56) References Cited

U.S. PATENT DOCUMENTS

| 1,958,768 | A | * | 5/1934 | Ross | F24H 3/0411 |
| | | | | | 55/472 |
| 4,522,255 | A | * | 6/1985 | Baker | F24F 1/0047 |
| | | | | | 165/48.1 |
| 4,738,188 | A | * | 4/1988 | Nishida | F24F 11/0001 |
| | | | | | 454/229 |
| 5,240,478 | A | * | 8/1993 | Messina | A62B 11/00 |
| | | | | | 55/356 |
| 5,399,319 | A | * | 3/1995 | Schoenberger | B01D 46/0028 |
| | | | | | 55/385.2 |
| 5,435,817 | A | * | 7/1995 | Davis | F24F 8/10 |
| | | | | | 96/204 |
| 6,797,042 | B2 | * | 9/2004 | LaFerriere | B01D 46/0028 |
| | | | | | 55/472 |
| 7,635,297 | B2 | * | 12/2009 | Takeshita | F24F 13/068 |
| | | | | | 454/301 |
| 7,789,921 | B2 | * | 9/2010 | Thurin | B01D 46/0049 |
| | | | | | 55/467 |
| 10,203,124 | B2 | * | 2/2019 | Jeong | F24F 13/082 |
| 2001/0011007 | A1 | * | 8/2001 | Akhtar | F24F 7/007 |
| | | | | | 454/906 |
| 2004/0020363 | A1 | * | 2/2004 | LaFerriere | B01D 46/12 |
| | | | | | 95/273 |

(Continued)

*Primary Examiner* — Ko-Wei Lin
(74) *Attorney, Agent, or Firm* — Zeman-Mullen & Ford, LLP

(57) ABSTRACT

An air circulation and/or purification device for recirculating air and/or removing contaminants from the air which includes a housing having a top with an opening for air intake and a bottom, a fan contained within the housing, and a plurality of air output vents contained within multiple sides of the housing near the bottom of the housing. The bottom of the housing may include a conical shaped portion extending inward from the bottom of the housing or other structures to assist in expelling air from the housing in at least two different directions. The device may also include one or more filters designed to capture and filter out different types of contaminants.

22 Claims, 11 Drawing Sheets

(56) References Cited

U.S. PATENT DOCUMENTS

| | | | |
|---|---|---|---|
| 2006/0097411 A1* | 5/2006 | Kim | B01D 47/021 261/89 |
| 2010/0064895 A1* | 3/2010 | Thurin | F24F 8/10 96/222 |
| 2011/0000566 A1* | 1/2011 | Ruponen | F24F 1/01 138/38 |
| 2011/0291617 A1* | 12/2011 | Rosenbecker | F04D 25/08 320/112 |
| 2013/0052090 A1* | 2/2013 | Bohlen | A61L 9/205 422/121 |
| 2013/0149956 A1* | 6/2013 | Su | F24F 7/007 454/329 |
| 2015/0343361 A1* | 12/2015 | Holzmann | B01D 46/69 95/278 |
| 2016/0178224 A1* | 6/2016 | Venturelli | F24F 11/70 700/276 |
| 2018/0372368 A1* | 12/2018 | Carlson | F24F 3/1411 |

* cited by examiner

METHOD AND APPARATUS FOR AIR CIRCULATION AND PURIFICATION

FIELD OF INVENTION

The present invention generally relates to an air circulating and purifying device which removes contaminants from the air such as solid particles, liquid droplets, and/or gases. In particular, the air circulating and purifying device of the present invention can be used during remediation, restoration, renovation, remodeling and construction projects to remove contaminants such as dust, dirt, mold spores and fragments, soot, smoke particles, lead, asbestos and volatile organic compounds (VOCs). The air circulating and purifying device may also be used to remove contaminants such as pollen, pet dander, and (insect) dust mite feces. The air circulating and purifying device of the present invention can be used in commercial, industrial, and domestic applications. The device includes a housing having a top with an opening for air intake and a bottom with a conical shaped portion having a wide open end and a narrow closed end extending inward from the bottom, a plurality of blades and a motor for moving the plurality of blades all contained within the housing, and a plurality of air output vents contained within multiple sides of the housing near the bottom of the housing. The device may also include one or more filters designed to filter out and capture different types of contaminants.

BACKGROUND OF THE INVENTION

Air filtration devices and air purifiers are frequently used to remove contaminants from the air for individuals with allergies, respiratory problems, and compromised immune systems. The use of air filtration devices and air purifiers is also becoming increasingly common to help protect occupants and workers at remediation, restoration, renovation and construction sites. The value of these devices is especially critical on jobs at these sites that involve respiratory hazards, the use of which allows employers to stay compliant with OSHA regulations defined under the 29 CFR 1910.34 standard for respiratory protection [1910.134(a)(1)].

Airborne contaminants such as mold, dust, asbestos, lead, chemical fumes, etc. may be present or created in remediation, restoration, renovation and construction environments. These hazardous particles can be inhaled by workers and others present at the site. In addition, they can settle on flooring, carpet, upholstery, and other furnishings and may also be drawn into an HVAC system resulting in the contamination of other parts of a building. If not removed, these contaminants will have a negative effect on the indoor air quality of the worksite and can cause adverse human health effects when inhaled. They can also increase exposure to costly liability claims and compromise the quality of an entire remediation, restoration, renovation, or construction job.

When contaminants are filtered from the air, they may be filtered in several stages by size. Pre-filters of varying size may be used to capture large particles. A high efficiency particulate air (HEPA) filter is designed to capture at least 99.97% of particulates down to 0.3 microns in size. Other types of filters are designed to remove other types of contaminants. For example, an activated carbon filter can adsorb organic vapors to help remove unwanted odors.

Air filtration and purification devices are sometimes called air scrubbers or negative air machines and are positioned in a center of a room or enclosed area. The air within the enclosed area is filtered through the device and recirculated after airborne contaminants are captured by the filters contained within the device. As a result, the air quality within the enclosed area is greatly improved.

For air filtration using air purifying devices, a minimum of four air changes per hour is typically recommended which means that the full air volume in the room is exchanged four times every hour. For Class I asbestos abatements, four ACH is required by Federal OSHA regulation 1926.1101(g)(5)(i)(A)(2). Full air volume in a room exchanged four to twelve times every hour is typically recommended as optimal. The faster that filtered air can be recirculated back to the air capture zone, the faster and more efficient the air filtration and purification device will be in achieving improved air quality. Due to singular, one-directional output, current HEPA filtration units do not create a flow of air within a room that enables air to efficiently pass through the HEPA filter. The present invention is directed to a low profile, lightweight air purification device that is capable of providing increased circulation of filtered air back to the capture zone thereby resulting in a faster and more efficient air purification device.

SUMMARY OF THE INVENTION

The present invention is directed to an air circulation and filtration/purification device for removing contaminants from the air. In one aspect, the present invention may take the form of an air filtration device that is capable of quickly and efficiently filtering one or more of solid particles, liquid droplets, and/or gases from the air within an enclosed area. In another aspect, the present invention may take the form of an air circulation device that is capable of quickly and efficiently circulating air within an enclosed area without filtration. In this aspect of the invention, the air circulation device may be used to dry an enclosed area and/or materials contained within an enclosed area with or without the addition of a heating device. In all aspects of the invention, the invention includes a housing that is designed to maximize circulation of air back to the air capture zone of the device.

In one exemplary embodiment, the air circulation device of the present invention includes a housing having a top with at least one opening therethrough and a bottom with a conical shaped portion having a wide open end and a narrower closed end, a plurality of blades and a motor for moving the plurality of blades both contained within the housing, and a plurality of air output vents contained within multiple sides of the housing near the bottom of the housing such that air expelled through the air output vents is expelled in at least two different directions. In one example, the multiple sides of the housing may take the form of four square shaped sides or four rectangular shaped sides (or round sides or anywhere in between) with an air output vent contained within each of the four sides to enable air to be expelled from the device in four different directions. In another example, the multiple sides of the housing may take the form of a cylindrical shape having four air output vents positioned about a circumference of the cylindrical shape to enable air to be expelled from the device in four different directions. The narrow end of the conical shaped portion of the device may also include an opening therethrough to further assist moving air through the device and back to the air capture zone of the device, namely the one or more openings contained in the top of the housing.

The air circulation device may include a power inlet for connecting a source of power to the device as well as an on/off switch. The air circulation device may also include a ground-fault circuit interrupter (GFCI) outlet for connecting other pieces of equipment to the device and for shutting off power to the air circulation device in the event of a ground fault. The ability to daisy chain or connect other pieces of equipment to the device is beneficial when limited outlets are present and/or when other equipment needs to be located and run near the air circulation device. For example, another piece of equipment containing an anemometer for measuring the speed and/or volume of the air moving through the circulation device may be plugged into the GFCI outlet of the air circulation device to maintain consistent air flow volume through the device. Alternatively, an anemometer may be mounted within the housing near an air inlet or an air output or exhaust vent of the device for measuring the speed (velocity) and/or volume of air moving through the device. The anemometer may also be in communication with a control element capable of controlling air movement within the device to maintain consistent air flow volume through the device. The air circulation device of the present invention may further include a control element for varying the speed at which the plurality of blades are moving within the device. This control element may be programmed to automatically vary the speed of the blades in order to maintain a consistent air flow volume through the device. The air circulation device of the present invention may also include a timer for recording and displaying a total amount of time the device has been operating during its lifetime. The timer may also function to allow a user to set an amount of time for the device to remain operating during a particular use of the device. The top of the housing and/or bottom of the housing may be removable for easy replacement of elements within the device and/or for easy cleaning of the interior of the device.

The air circulation device of the present invention may also include one or more foot members and/or one or more wheels extending outward from the bottom of the housing near an outer perimeter of the bottom of the housing to stabilize the placement of the device during operation of the device or to facilitate movement of the device. The device may also include one or more handle members for easy lifting and transport of the device. Handle members may be formed within the device such as molded as part of the housing of the device. The device may also include one or more support members extending outward from a side of the housing of the device for supporting the air circulation device in a horizontal position as opposed to a vertical position. Such support members may also function as, and take the place of, handle members.

In another exemplary embodiment of the device, the present invention is directed to an air circulation and purification device which captures and removes contaminants from the air. The air circulation and purification device of the present invention includes a housing having a top with at least one opening therein, a bottom, and a plurality of sides positioned between the top and the bottom of the housing, a fan contained within the housing, an air output vent contained within each of two or more of the plurality of sides of the housing near the bottom of the housing so that air expelled through the output vents is expelled in at least two different directions. The bottom of the housing may include a conical shaped portion extending upward from the bottom of the housing so that air contained within the housing between the conical shaped portion of the housing and the sides of the housing can move outside the housing through the air output vents. The device may also include at least one filter contained with the housing near the top of the housing. The filter may be positioned between the top of the housing and the fan so that air drawn into the device through the opening in the top of the housing is drawn through the filter by the fan. The filter may be a high efficiency particulate air (HEPA) filter. The air circulation and purification device may also include a first pre-filter contained within the housing that is positioned above the HEPA filter. The air circulation device and purification device may also include a second pre-filter contained within the housing that is positioned between the first pre-filter and the HEPA filter.

The air circulation and purification device of the present invention may also include at least one control element for varying the speed of the fan and an anemometer contained within the housing of the device for measuring speed and/or volume of air moving through the device. The control element may be programmed to automatically vary the speed of the fan in order to maintain a consistent air flow volume through the device. The anemometer may be in communication with the control element to assist in this function of maintaining a consistent air flow volume through the device.

The air circulation and purification device of the present invention may also include a second fan contained within the housing that is located between the fan and the bottom of the housing and an exhaust vent contained within a side of the housing located near the second fan to create a negative pressure within an area in which the device is operating. The second fan may be positioned in a perpendicular relationship with respect to the fan. The negative pressure created by the second fan assists in keeping the contaminated air being treated within the area from escaping or moving into other areas.

In one example, the plurality of sides of the housing may take the form of four square shaped sides or four rectangular shaped sides with an air output vent contained within each of the four sides to enable air to be expelled from the device in four different directions. In another example, the plurality of sides of the housing may take the form of a cylindrical shape having four air output vents positioned about a circumference of the cylindrical shape to enable air to be expelled from the device in four different directions (360 degrees). The narrow end of the conical shaped portion of the device may also include an opening therethrough to further assist moving air through the device and back to the air capture zone of the device, namely the one or more openings contained in the top of the housing.

The air circulation and purification device of the present invention may include a power inlet for connecting a source of power to the device as well as an on/off switch. The air circulation and purification device of the present invention may also include a ground-fault circuit interrupter (GFCI) outlet for connecting other pieces of equipment to the device and for shutting off power to the air circulation and purification device in the event of a ground fault. The ability to daisy chain or connect other pieces of equipment to the device is beneficial when limited outlets are present and/or when other equipment needs to be located and run near the air circulation device. For example, another piece of equipment containing an anemometer for measuring the speed and/or volume of the air moving through the circulation device may be plugged into the GFCI outlet of the air circulation and purification device to maintain consistent air flow volume through the device. Alternatively, as previously described, an anemometer may be mounted within the housing near an air inlet or an air output vent of the device for measuring the speed and/or volume of air moving through the device. The anemometer may also be in communication with a control element capable of controlling air movement within the device to maintain consistent air flow volume through the device.

The air circulation and purification device of the present invention may also include a timer for recording and displaying a total amount of time the device has been operating during its lifetime. The timer may also function to allow a user to set an amount of time for the device to remain operating during a particular use of the device. The top of the housing and/or bottom of the housing may be removable for easy replacement of elements within the device and/or for easy cleaning of the interior of the device. For example, a removable top of the housing enables easy removal and replacement of a HEPA filter and other filters. The air circulation and purification device of the present invention may also include one or more foot members and/or one or more wheels extending outward from the bottom of the housing near an outer perimeter of the bottom of the housing to stabilize the placement of the device during operation of the device or to facilitate movement of the device. The device may also include one or more handle members for easy lifting and transport of the device. Handle members may be formed within the device such as molded as part of the housing of the device. The device may also include one or more support members extending outward from a side of the housing of the device for supporting the air circulation and purification device in a horizontal position as opposed to a vertical position. Such support members may also function as, and take the place of, handle members.

The present invention is also directed to a method for purifying and circulating air that includes the steps of 1) providing a device which includes a housing having a top with at least one opening therein, a bottom, a fan contained within the housing, at least one filter contained within the housing between the top of the housing and the fan, and an air output contained within each of two or more sides of the housing bear the bottom of the housing, 2) providing power to the device; 3) drawing air into the interior of the device through the opening(s) in the top of the housing, 4) moving the air through the filter(s) contained within the housing, and 5) expelling the filtered air from the interior area of the housing in at least two different directions through the output vents located near the bottom of the housing. The method could include expelling air from the output vents located throughout the sides of the housing such that air is expelled in multiple directions including 360 degrees around the outer surface of the housing.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

DESCRIPTION OF EXEMPLARY EMBODIMENTS

Figure 1:
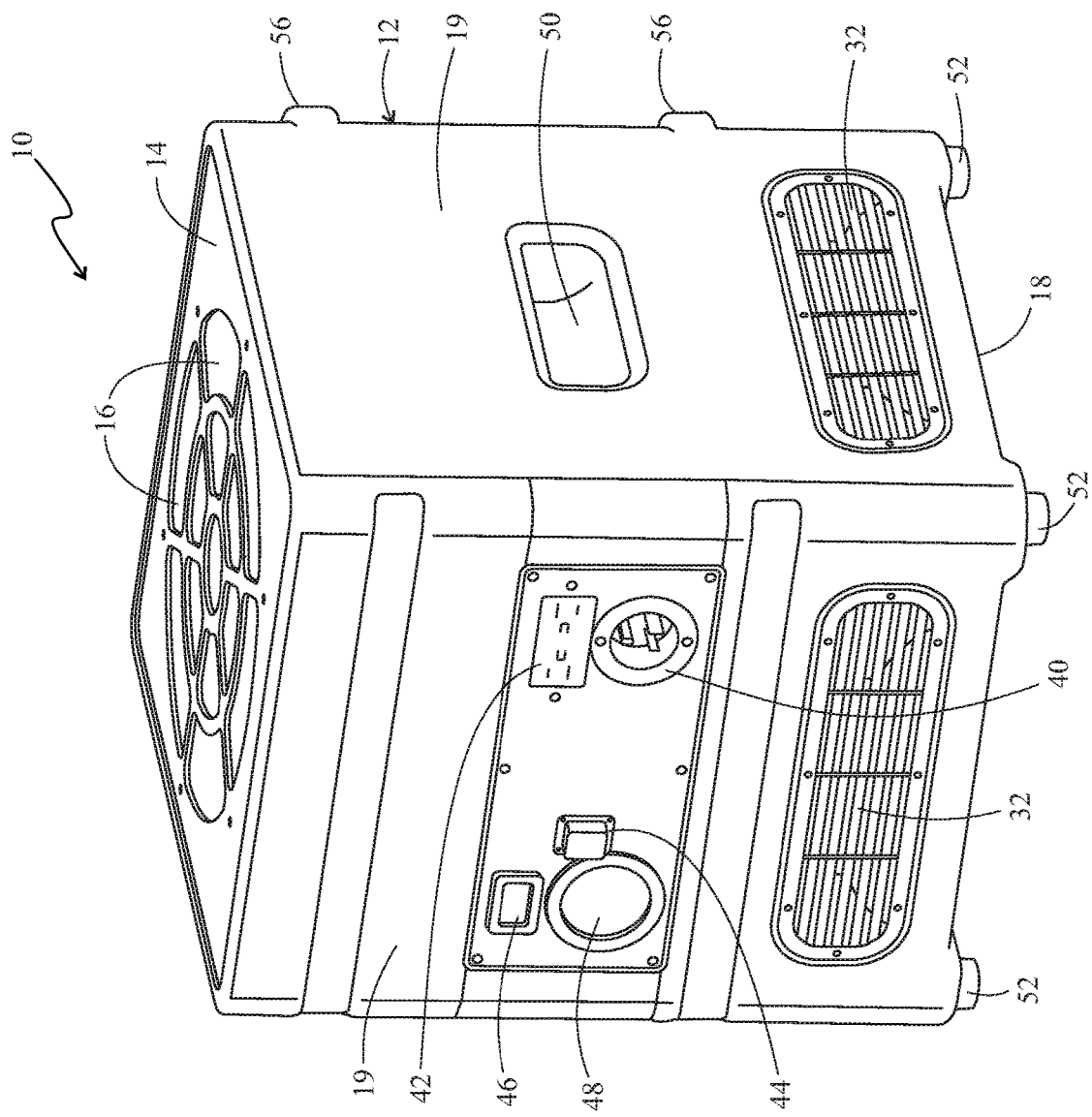
FIG. 1 is a perspective view of an exemplary embodiment of an air circulation and purification device in accordance with the present invention.

In the following detailed description of exemplary embodiments, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

Air circulation and/or filtration devices air extremely important in the restoration and cleaning of residential, commercial, and industrial properties. The present invention is directed to a method and apparatus for air circulation and/or purification. A perspective view of an exemplary embodiment of an air circulation and purification device 10 in accordance with the present invention is shown in FIG. 1. Air circulation and purification device 10 includes a housing 12 having a top 14 with at least one opening 16 therein for air intake, a bottom 18, and multiple sides 19 positioned between the top 14 and bottom 18 of the device 10. Device 10 also includes a plurality of air output vents 32 with an output vent 32 contained within each of the multiple sides 19 of housing 12. Housing 12 may also include one or more support members 56 which may be connected to housing 12 or formed integrally as part of housing 12. Support members 56 function to support the device 10 when it is placed on its side for use in a horizontal position as opposed to a vertical upright position as shown in FIG. 1.

Device 10 also includes a power inlet 40 for connecting device 10 to a source of power. Device 10 may also include an on/off switch 44 and a ground-fault circuit interrupter (GFCI) outlet 42 to daisy chain or connect other pieces of equipment to device 10, including another piece of equipment like device 10. The GFCI outlet 42 also functions as a safety element for shutting off power to the device 10 in the event of a ground-fault. In addition, a piece of equipment having an anemometer which measures air speed and/or air volume may be connected to device 10 to maintain a constant air flow volume through device 10. An anemometer may be connected to GFCI outlet 42 or may alternatively be attached to the power inlet 40 which would in turn be capable of attaching to a power source. Device 10 may also include a timer 46 for recording and displaying a total amount of time device 10 has been operating during its lifetime. Timer 46 may also be used for setting an amount of time for device 10 to remain operating when activating device 10 for a single use. Device 10 may also include a control element 48 for varying the speed at which air can be moved through device 10 and control element 48 may also provide for automatic control of device 10 to maintain a consistent air flow volume through the device 10. An anemometer contained within, or connected to, device 10 may assist in maintaining consistent air flow volume through device 10.

Air circulation and purification device 10 may also include one or more handles 50 for easily moving and/or transporting the device 10. Handles 50 may be connected to housing 12 or formed integrally as part of housing 12 as shown in FIG. 1. Device 10 may also include one or more foot members 52 or wheels extending outward from the bottom 18 of housing 12 near an outer perimeter of the bottom 18 of housing 12 to stabilize device 12 during use and/or to assist movement of device 12. Any combination of foot members 52 and/or wheels may be used and any wheels that are used may be lockable wheels.

Figure 2:
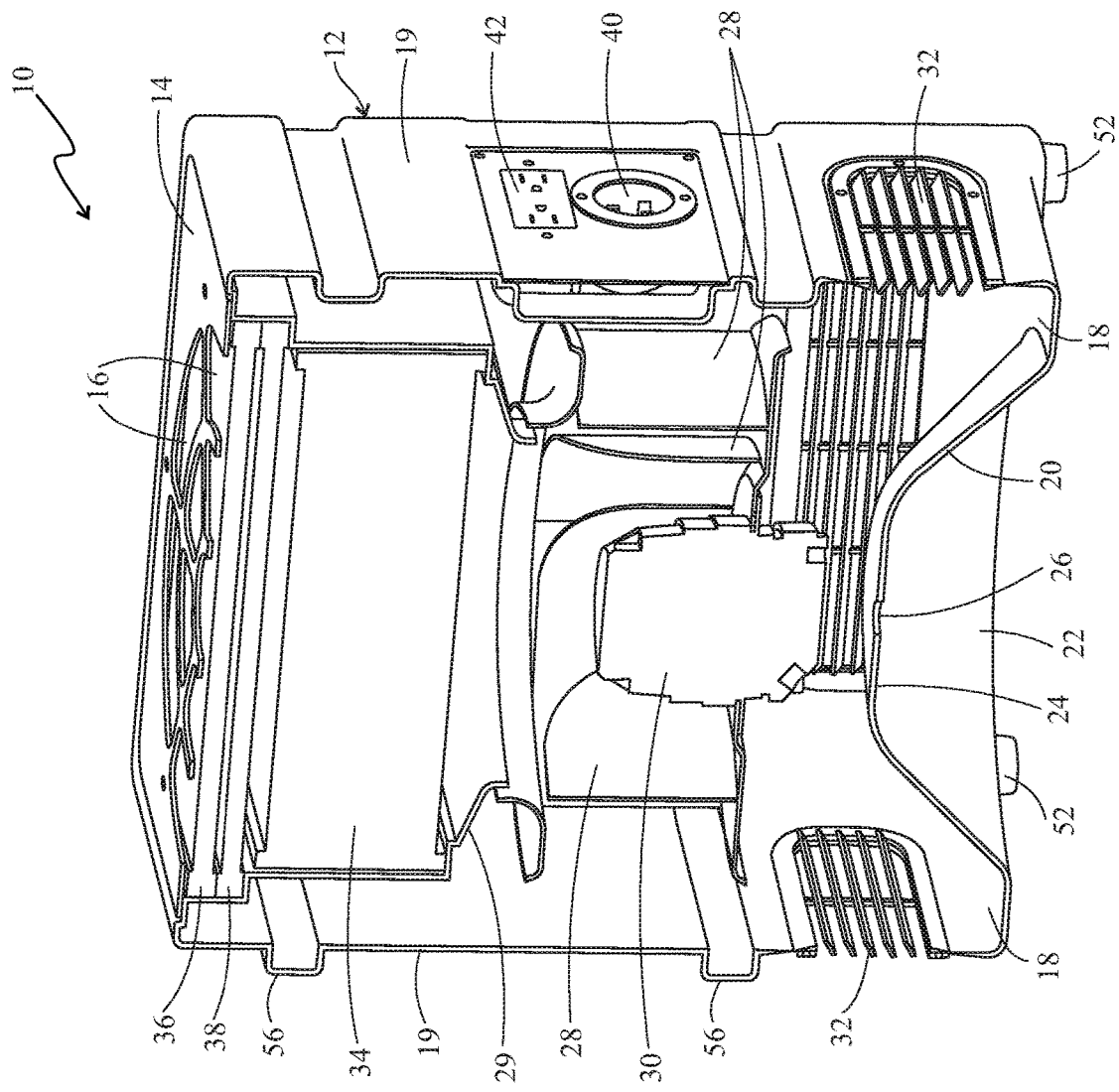
FIG. 2 is a cut away perspective view of the air circulation and purification device shown in FIG. 1 showing internal components of the device.

FIG. 2 is a cut away perspective view of the air circulation and purification device 10 shown in FIG. 1 showing the internal components of device 10. As shown in FIG. 2, housing 12 of device 10 includes a conical shaped portion 20 extending inward from the bottom 18 of housing 12 with the conical shaped portion 20 having a wide open end 22 and a narrower closed end 24. The narrow closed end 24 of conical shaped portion 20 of housing 12 may or may not include an opening 26. Device 10 includes plurality of blades 28 in communication with a motor 30, all contained within housing 12, for moving the plurality of blades 28 within the housing 12. The motor and plurality of blades may take the form of a fan and both a plurality of blades in communication with a motor and a fan are meant to be used interchangeably throughout the description of the embodiments of the invention. When the motor 30 moves the plurality of blades 28 within the housing 12, air is forced to move downward in a 360-degree direction around the conical shaped portion 20 of the housing 12 to enable a high volume of air to be expelled through housing 12 and through air output vents 32 and circulated back to opening(s) 16 in top 14 of housing 12 which function as air intake opening(s) for the device 10. Housing 12 may also include additional structural elements 29 within housing 12 for directing air flow within the device 10 toward the blades 28 and motor 30 (or fan) contained within the device 10.

Device 10 may also include one or more filters within housing 12 thereby making it an air purification device in addition to an air circulation device. Device 10 used without filters functions as an air circulation device without filtration/purification which is particularly useful in renovation and restoration when wet areas and structures need to be dried. In addition, heaters or heating devices can be attached to output vents 32 of housing 12 or can be connected to device 10 by plugging them into GFCI outlet 42. When also functioning as a filtration/purification unit, device 10 includes one or more filters such as a high efficiency particulate air (HEPA) filter. As shown in FIG. 2, HEPA filter 34 is contained within housing 12 and located between the top 14 of housing 12 and the plurality of blades 28 and motor 30 contained within housing 12. One or more additional filters may also be included within housing 12 to pre-filter large sized contaminants from the air before the air enters the HEPA filter 34 contained within housing 12. For example, as shown in FIG. 2, a first pre-filter 36 is contained within housing 12 and located above the HEPA filter 34 and a second pre-filter 38 is contained within housing 12 and located between first pre-filter 36 and the HEPA filter 34.

Many types of filters may be used within housing 12 to purify contaminated air entering opening(s) 16 in the top 14 of the housing 12 which function as an air intake or air input areas into the device 10. HEPA filters achieve certain standards of efficiency and remove 99.97% of particles greater than or equal to 0.3 micrometers in size from air that passes through the HEPA filter. Filters containing carbon and/or activated charcoal may also be used within device 10 to trap and remove odor molecules. These types of filters are particularly useful in removing/eliminating smoke and/or other odors. Chemicals in the form of gels and/or volatile solids may also be used within the device 10 between the top 14 of housing 12 and blades 28 and motor 30 contained within housing 12 to filter odors from the air.

Figure 3:
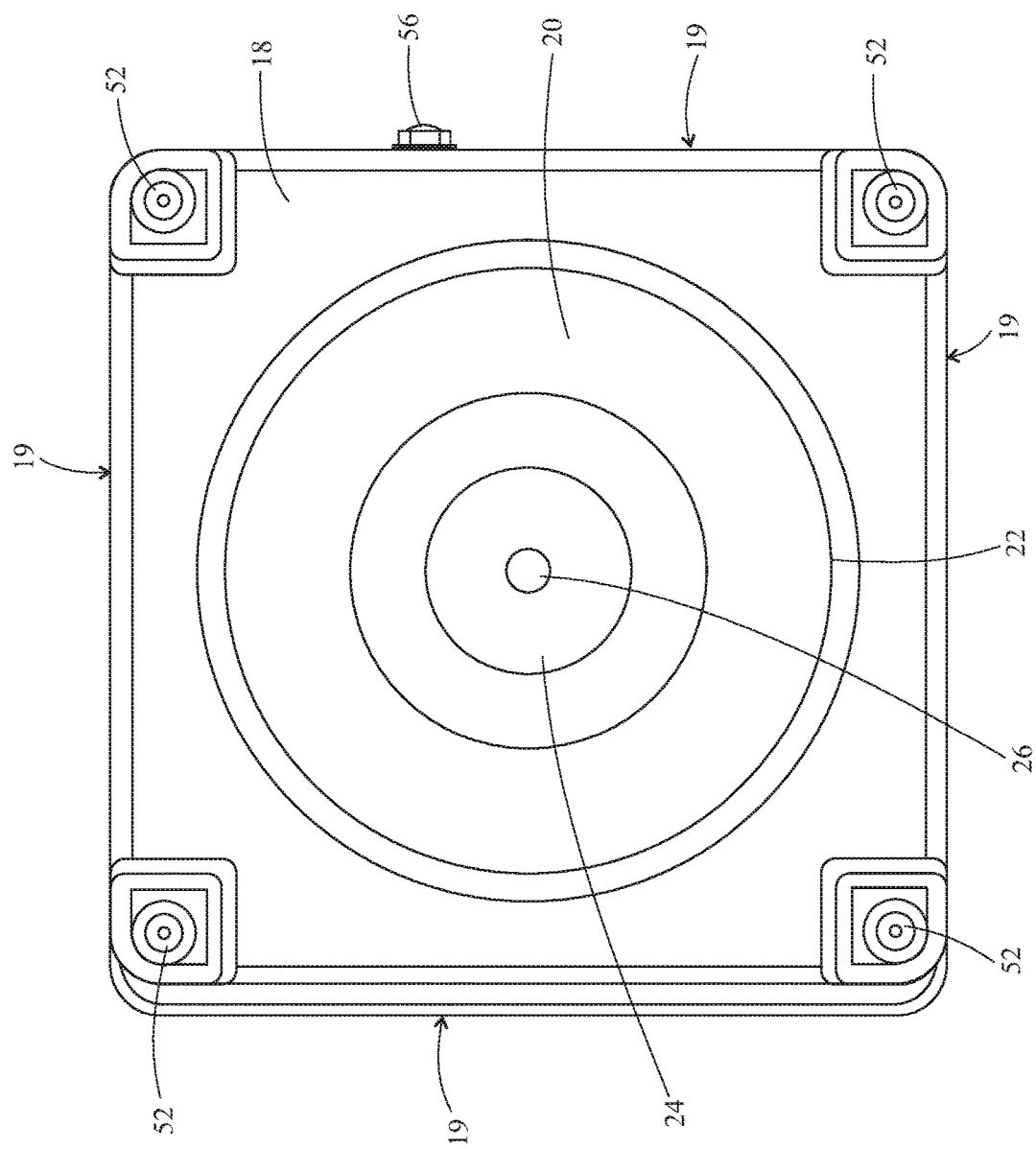
FIG. 3 is a bottom perspective view of the air circulation and purification device shown in FIGS. 1 and 2.

FIG. 3 is a bottom perspective view of the air circulation and purification device 10 shown in FIGS. 1 and 2. As shown in FIG. 3, housing 12 includes a conical shaped portion 20 which extends inward from the bottom 18 of housing 12. Conical shaped portion 20 of housing 12 includes a wide open end 22 and a narrower closed end 24. Although narrower closed end 24 may or may not include an opening, FIG. 3 shows narrower closed end 24 with an opening 26.

Figure 4:
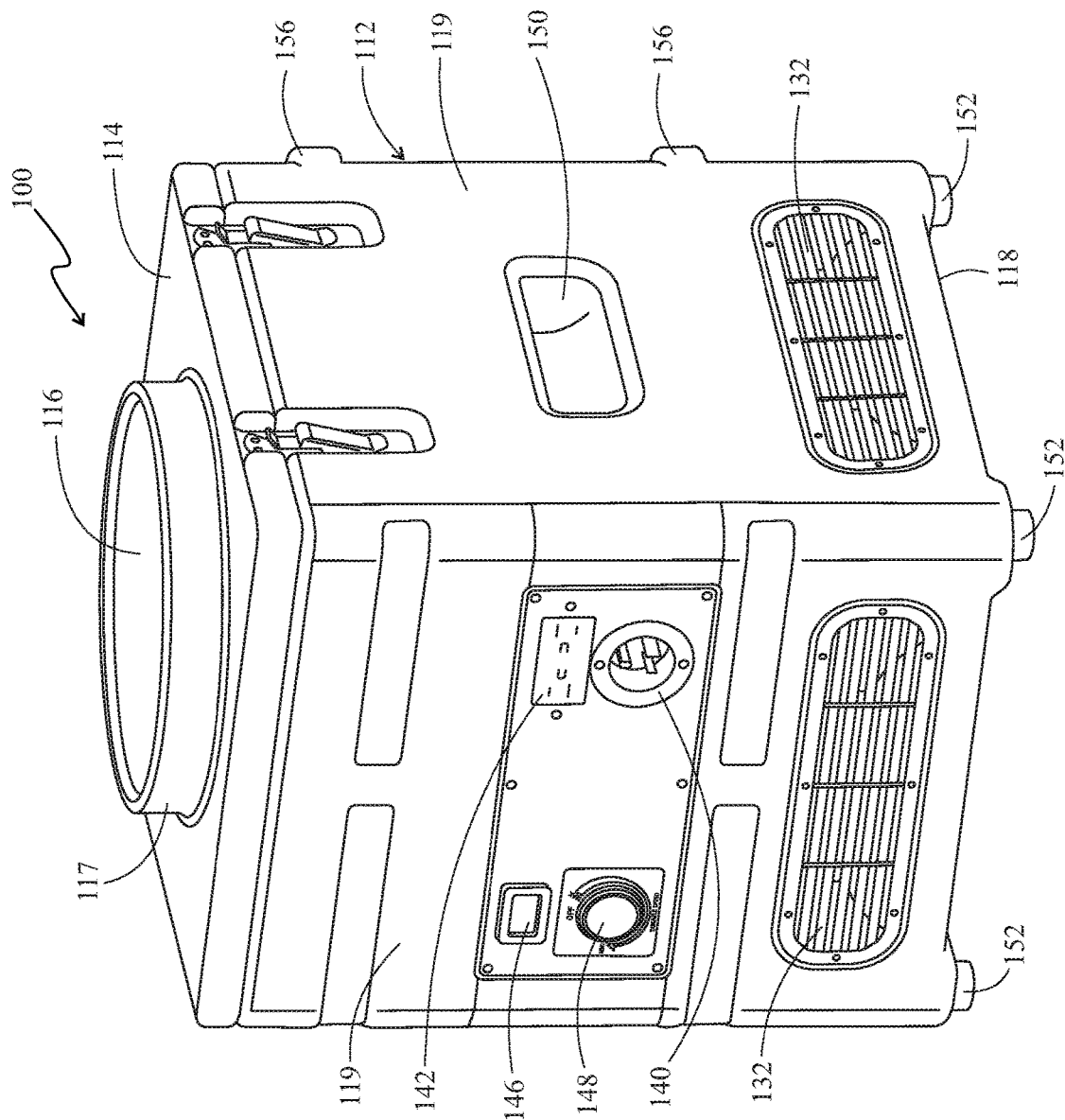
FIG. 4 is a perspective view of another exemplary embodiment of an air circulation and purification device in accordance with the present invention.

A perspective view of another exemplary embodiment of an air circulation and purification device 100 in accordance with the present invention is shown in FIG. 4. Air circulation and purification device 100 includes a housing 112 having a removable top 114 with at least one opening 116 therein for air intake, a bottom 118, and multiple sides 119 positioned between the top 114 and bottom 118 of the device 100. In this exemplary embodiment, removable top 114 of housing 112 includes one large opening 116 and a ridge member 117 extending upward from the circumference of the large opening 16 and about the entire circumference of opening 16. In conjunction with opening 116, ridge member 117 forms a low profile cylindrical opening into the interior of housing 112 which functions as an air intake into device 100. Device 100 also includes a plurality of air output vents 132 with an output vent 132 contained within each of the multiple sides 119 of housing 112. Housing 112 may also include one or more support members 156, which may be connected to housing 112 or formed integrally as part of housing 112, for supporting device 100 when it is placed on its side for use in a horizontal position as opposed to a vertical upright position as shown in FIG. 4.

Like device 10 shown in FIGS. 1-3, device 100 also includes a power inlet 140 for connecting device 100 to a source of power, an on/off switch (not shown), and a ground-fault circuit interrupter (GFCI) outlet 142 to daisy chain or connect other pieces of equipment to device 100, including another piece of equipment like device 100. The GFCI outlet 142 also functions as a safety element for shutting off power to the device 100 in the event of a ground-fault. Similar to device 10 as previously described above, a piece of equipment having an anemometer which measures air speed and/or air volume may be connected to device 100 to maintain a constant air flow volume through device 100. An anemometer may be connected to GFCI outlet 142 or may alternatively be attached to the power inlet 140 which would in turn be capable of attaching to a power source. Device 100 may also include a timer 146 for recording and displaying a total amount of time device 100 has been operating during its lifetime and/or for setting an amount of time for device 100 to remain operating when activating device 100 for a single use. Device 100 may also include a control element 148 for varying the speed at which air can be moved through device 100 and for automating device 100 to maintain a consistent air flow volume through it. An anemometer contained within, or connected to, device 100 may assist in maintaining consistent air flow volume through device 100. Air circulation and purification device 100 may also include one or more handles 150 which may be connected to housing 112 or formed integrally as part of housing 112 as shown in FIG. 4. Device 100 may also include one or more foot members 152 or wheels extending outward from the bottom 118 of housing 112 near an outer perimeter of the bottom 118 of housing 112. Any combination of foot members 152 and/or wheels may be used and any wheels that are used may be lockable wheels.

Figure 5:
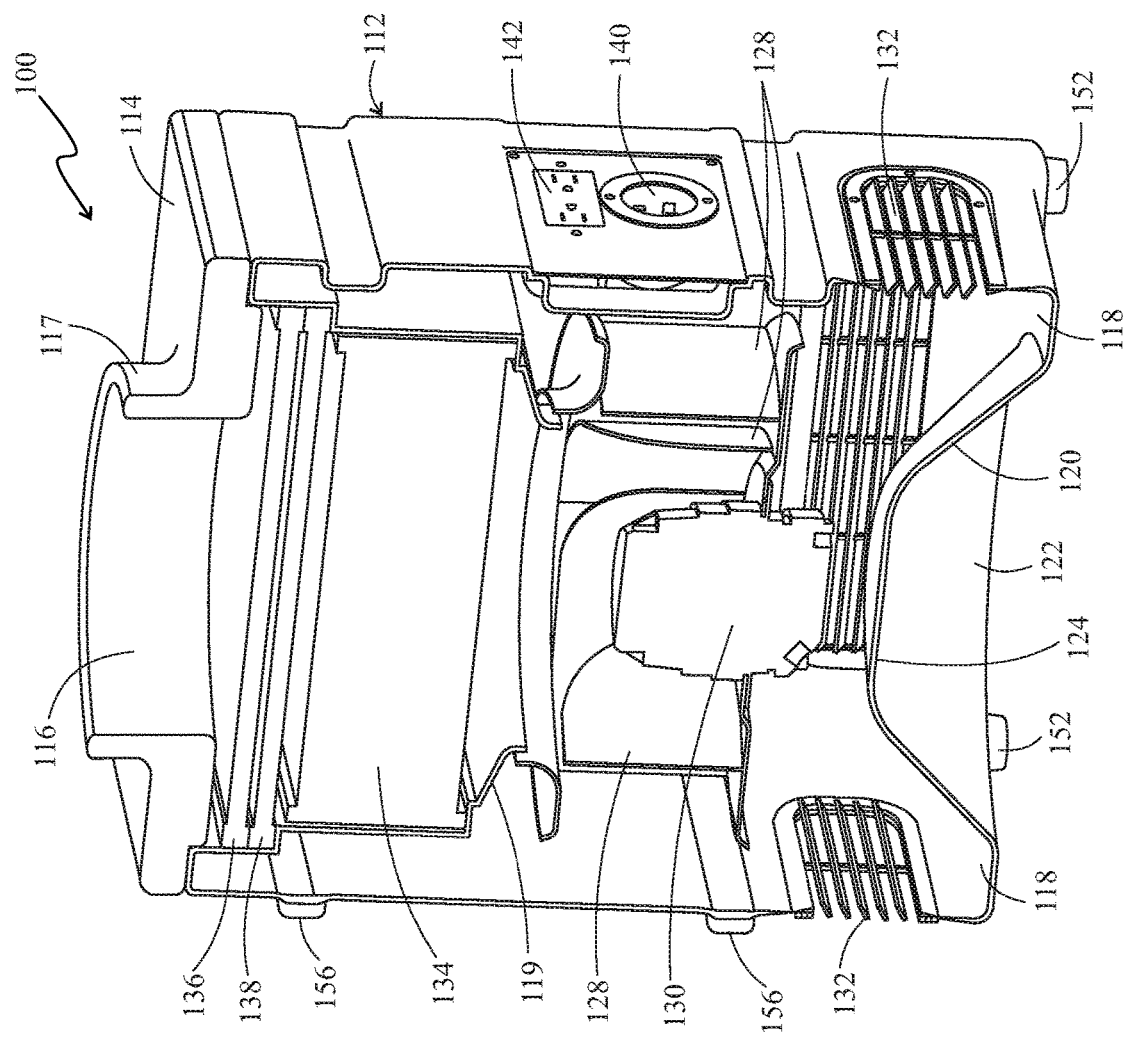
FIG. 5 is a cut away perspective view of the air circulation and purification device shown in FIG. 4 shown internal components of the device.

FIG. 5 is a cut away perspective view of the air circulation and purification device 100 shown in FIG. 4 showing the internal components of device 100. As shown in FIG. 4, housing 112 of device 110 includes a conical shaped portion 120 extending inward from the bottom 118 of housing 112 with the conical shaped portion 120 having a wide open end 122 and a narrower closed end 124. The narrow closed end 124 of conical shaped portion 120 of housing 112 may or may not include an opening. Device 100 includes plurality of blades 128 in communication with a motor 130, all contained within housing 112, for moving the plurality of blades 128 within the housing 112. As previously described with reference to FIG. 2, blades 128 and motor 130 are meant to be used interchangeably with fan throughout the description of the embodiments of the invention. When the motor 130 moves the plurality of blades 128 within the housing 112, air is forced to move downward in a three hundred sixty (360) degree direction around the conical shaped portion 120 of the housing 112 to enable a high volume of air to be expelled through housing 112 and through air output vents 132 and circulated back to opening 116 in top 114 of housing 112 which function as an air intake for device 100. Housing 112 may also include additional structural elements 129 within housing 112 for directing air flow within the device 100 toward the blades 128 and motor 130 (or fan) contained within device 100.

Like device 10, device 100 may also include one or more filters within housing 112 thereby making it an air purification device in addition to an air circulation device. Device 100 may be used without filters as an air circulation device, without or without the addition of heaters, as previously described above with reference to device 10. When functioning as an air circulation and filtration/purification unit, device 100 includes one or more filters such as a high efficiency particulate air (HEPA) filter. As shown in FIG. 5, HEPA filter 134 is contained within housing 112 and located between the top 114 of housing 112 and the plurality of blades 128 and motor 130 contained within housing 112. One or more additional filters may also be included within housing 112 to pre-filter large sized contaminants from the air before the air enters the HEPA filter 134 contained within housing 112. For example, as shown in FIG. 5, a first pre-filter 136 is contained within housing 112 and located above the HEPA filter 134 and a second pre-filter 138 is contained within housing 112 and located between first pre-filter 136 and the HEPA filter 134. Further, as previously described above with reference to device 10, many types of filters may be included within housing 112 of device 100 to further filter/purify contaminated air including the removal/elimination of odor from contaminated air.

Figure 6:
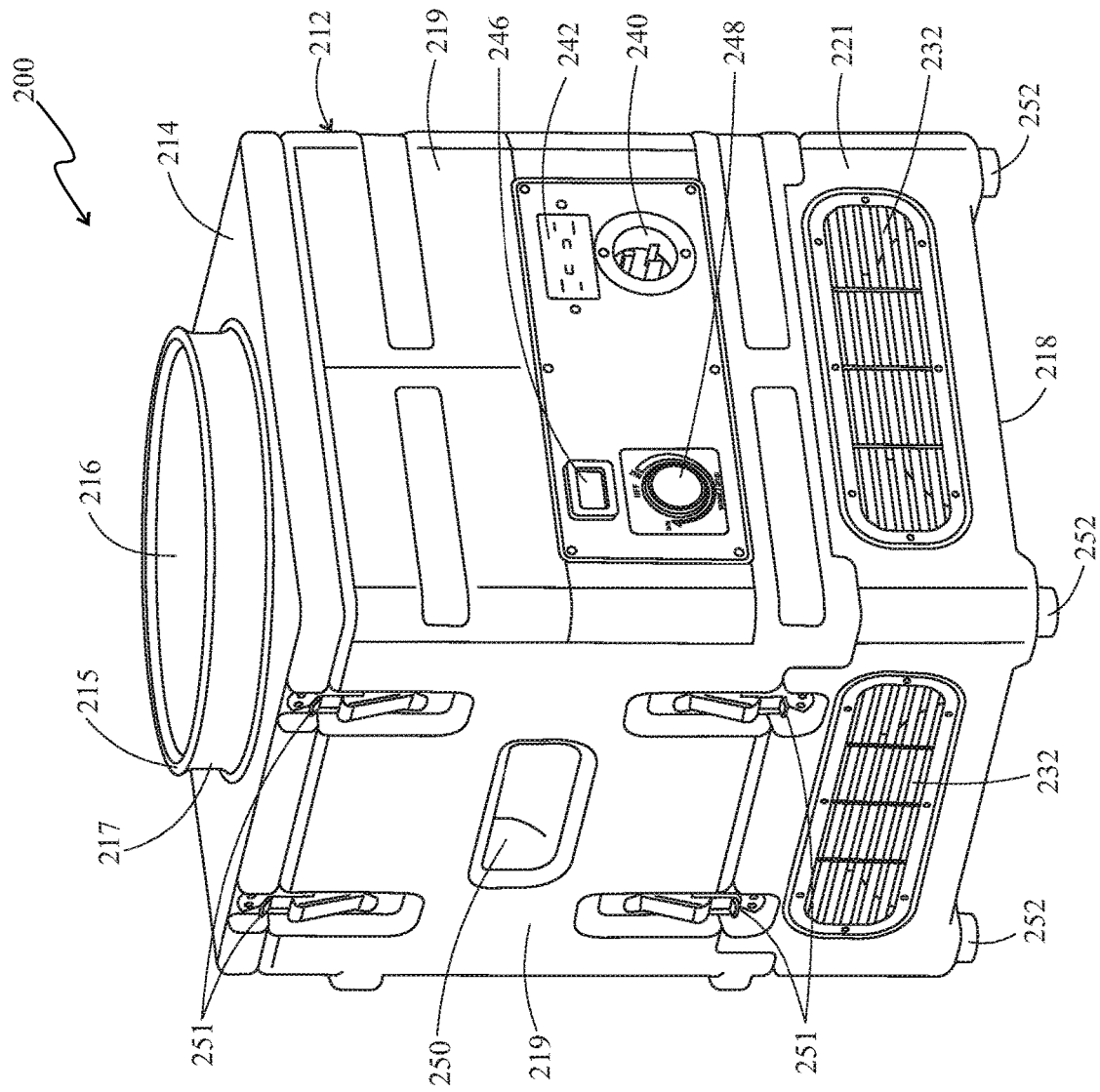
FIG. 6 is a perspective view of yet another exemplary embodiment of an air circulation and purification device in accordance with the present invention.

FIG. 6 is a perspective view of yet another exemplary embodiment of an air circulation and purification device 200 in accordance with the present invention. Device 200 is nearly identical to device 100 but includes a housing 212 having a removable bottom portion 221 in addition to a removable top 214. Device 200 includes a housing 212 having a removable top 214 with a large opening 216 therein for air intake, a bottom 218, and multiple sides 219 positioned between the top 214 and bottom 218. Large opening 216 in removable top 214 includes a ridge member 217 extending upward from the circumference of the large opening 216 about the circumference of opening 216 and a lip member 215 extending outward from ridge member 217. In conjunction with opening 216, ridge member 217 and lip member 215 form a low profile cylindrical opening into the interior of housing 212 which functions as an air intake into device 200. Device 200 also includes a plurality of air output vents 232 with an output vent 232 contained within each of the multiple sides 219 of housing 212. Device 200 also includes a removable bottom portion 221 which includes bottom 218 of housing 212 and lower sides 219 including the air output vents 232 contained within each of the sides 219 of housing 212. Removable bottom portion 221 of housing 212 facilitates easy access to the interior of the device 200 and easy cleaning of the interior of the device 200. Removable top 214 and removable bottom portion 221 of housing 212 may be secured to one or more sides 219 of housing 212 via latches 251 or any other means known in the art for releasably securing one element to another. Housing 212 may also include one or more support members 256, which may be connected to housing 212 or formed integrally as part of housing 212, for supporting device 200 when it is placed on its side for use in a horizontal position.

Like device 10 shown in FIGS. 1-3 and device 100 shown in FIGS. 4 and 5, device 200 also includes a power inlet 240 for connecting device 200 to a power source, an on/off switch (not shown), and a ground-fault circuit interrupter (GFCI) outlet 242 to daisy chain or connect other pieces of equipment to device 200, including another piece of equipment like device 200. The GFCI outlet 242 also functions as a safety element for shutting off power to the device 200 in the event of a ground-fault. Similar to device 10 and device 100 as previously described above, a piece of equipment having an anemometer which measures air speed and/or air volume may be connected to device 200 to maintain a constant air flow volume through device 200. An anemometer may be connected to GFCI outlet 242 or may alternatively be attached to the power inlet 240 which would in turn be capable of attaching to a power source. Device 200 may also include a timer 246 for recording and displaying a total amount of time device 200 has been operating during its lifetime and/or for setting an amount of time for device 200 to remain operating when activating device 200 for a single use. Device 200 may also include a control element 248 for varying the speed at which air can be moved through device 200 and for automating device 200 to maintain a consistent air flow volume through it. An anemometer contained within, or connected to, device 200 may assist in maintaining consistent air flow volume through device 200. Air circulation and purification device 200 may also include one or more handles 250 which may be connected to housing 212 or formed integrally as part of housing 212 as shown in FIG. 6. Device 200 may also include one or more foot members 252 or wheels extending outward from the bottom 218 of housing 212 near an outer perimeter of the bottom 218 of housing 212. Any combination of foot members 252 and/or wheels may be used and any wheels that are used may be lockable wheels.

Figure 7:
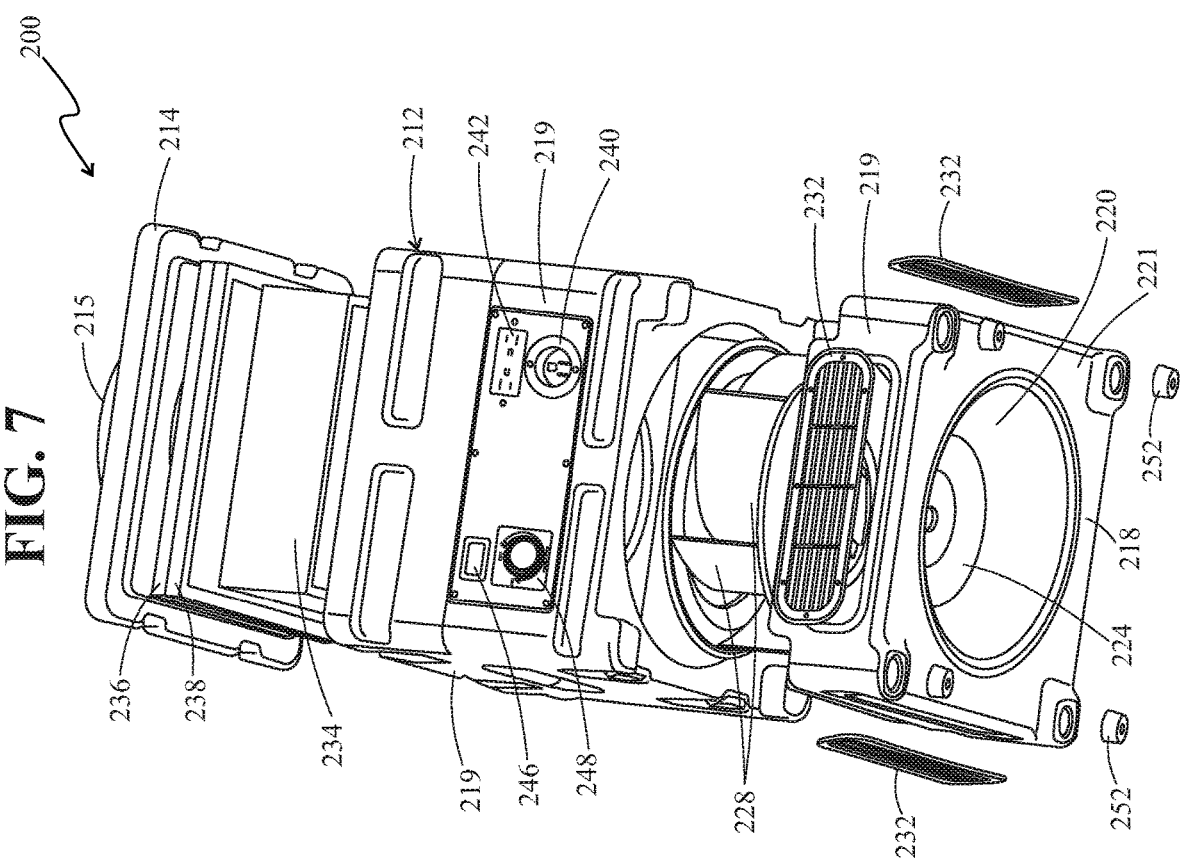
FIG. 7 is an exploded perspective view of the air circulation and purification device shown in FIG. 6.

FIG. 7 is an exploded perspective view of the air circulation and purification device 200 shown in FIG. 6. When functioning as an air circulation and filtration/purification unit, device 200 includes one or more filters such as a high efficiency particulate air (HEPA) filter. As shown in FIG. 7, HEPA filter 234 is contained within housing 212 and located between the top 214 of housing 212 and the plurality of blades 228 and motor 230 contained within housing 212. One or more additional filters may also be included within housing 212 to pre-filter large sized contaminants from the air before the air enters the HEPA filter 234 contained within housing 212. For example, as shown in FIG. 7, a first pre-filter 236 is contained within housing 212 and located above the HEPA filter 234 and a second pre-filter 238 is contained within housing 212 and located between first pre-filter 236 and the HEPA filter 234. Further, as previously described above with reference to device 10 and device 100, many types of filters may be included within housing 212 of device 200 to further filter/purify contaminated air including the removal/elimination of odor from contaminated air.

Figure 8:
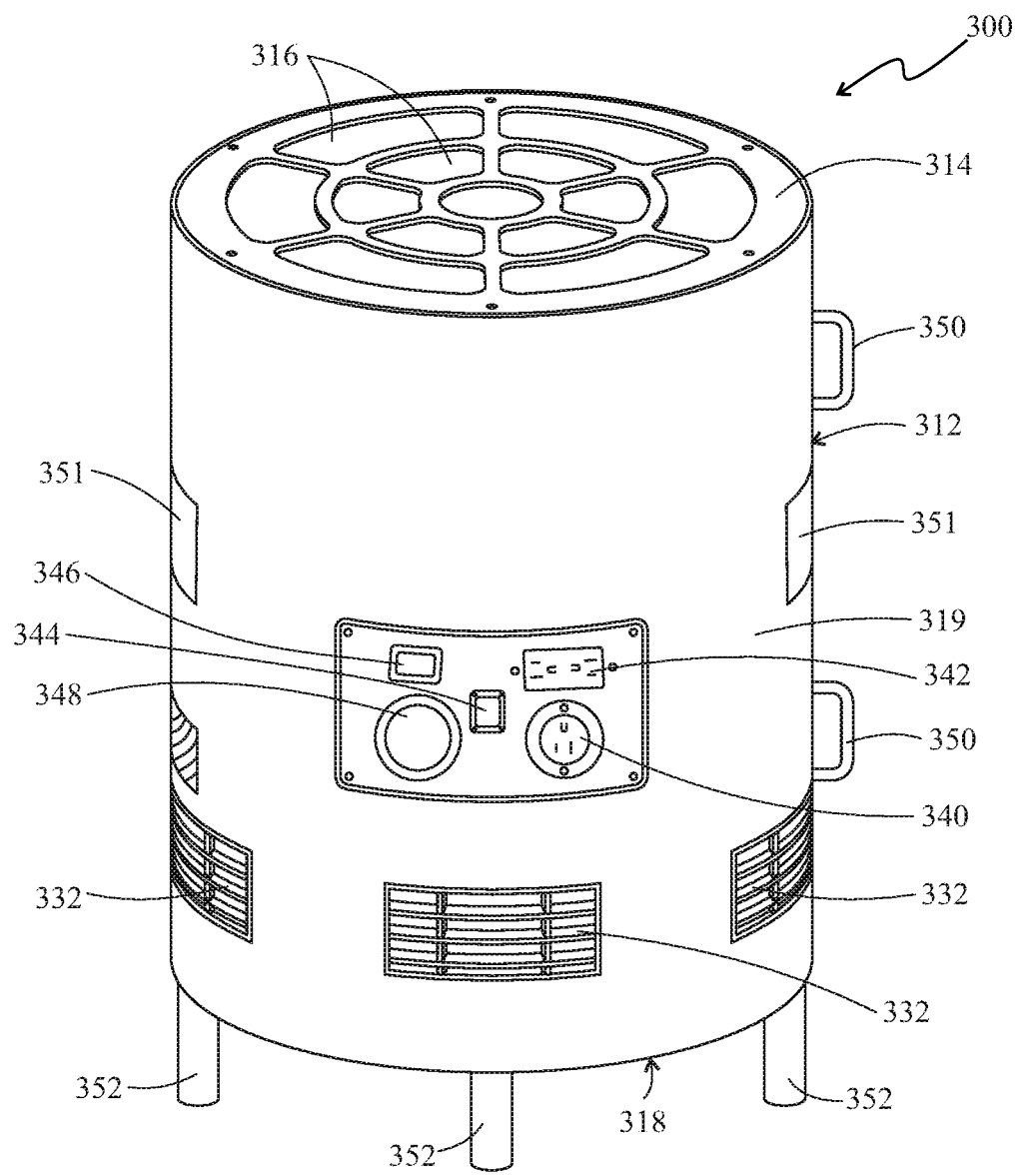
FIG. 8 is a perspective view of still another exemplary embodiment of an air circulation and purification device in accordance with the present invention.

FIG. 8 is a perspective view of still another exemplary embodiment of an air circulation and purification device 300 in accordance with the present invention. Air circulation and purification device 300 includes a housing 312 having a top 314 with at least one opening 316 therein for air intake, a bottom 318, and multiple sides 319 positioned between the top 314 and bottom 318 of the device 300. In this exemplary embodiment, housing 312 of device 300 has a hollow cylindrical shape having multiple sides 319. Device 300 also includes a plurality of air output vents 332 with an output vent 332 contained within multiple sides 319 of housing 312. In device 300, multiple air output vents 332, and in one example at least two or four air output vents 332, are contained within multiple sides 319 of housing 312 about a circumference of housing 312. Housing 312 may also include one or more support members/handle members 350 which may be connected to housing 312 or integrally formed as part of housing 312. Support members/handle members 350 function to support the device 300 when it is placed on its side for use in a horizontal position as opposed to a vertical upright position as shown in FIG. 8, and also function to facilitate movement and transport of device 300.

Device 300 also includes a power inlet 340 for connecting device 300 to a source of power. Device 300 may also include an on/off switch 344 and a ground-fault circuit interrupter (GFCI) outlet 342 to daisy chain or connect other pieces of equipment to device 300, including another piece of equipment like device 300. The GFCI outlet 342 also functions as a safety element for shutting off power to the device 300 in the event of a ground-fault. In addition, a piece of equipment having an anemometer which measures air speed and/or air volume may be connected to device 300 to maintain a constant air flow volume through device 300. An anemometer may be connected to GFCI outlet 342 or may alternatively be attached to the power inlet 340 which would in turn be capable of attaching to a power source. Device 300 may also include a timer 346 for recording and displaying a total amount of time device 300 has been operating during its lifetime. Timer 346 may also be used for setting an amount of time for device 300 to remain operating when activating device 300 for a single use. Device 300 may also include a control element 348 for varying the speed at which air can be moved through device 300 and control element 348 may also provide for automatic control of device 300 to maintain a consistent air flow volume through the device 300. An anemometer contained within, or connected to, device 300 may assist in maintaining consistent air flow volume through device 300.

Air circulation and purification device 300 may also include one or more additional handles 351 for easily moving and/or transporting the device 300. Handles 351 may be connected to housing 312 or formed integrally as part of housing 312. Device 300 may also include one or more foot members 352 or wheels extending outward from the bottom 318 of housing 312 near an outer perimeter of the bottom 318 of housing 312 to stabilize device 312 during use and/or to assist movement of device 312. Any combination of foot members 352 and/or wheels may be used and any wheels that are used may be lockable wheels.

Figure 9:
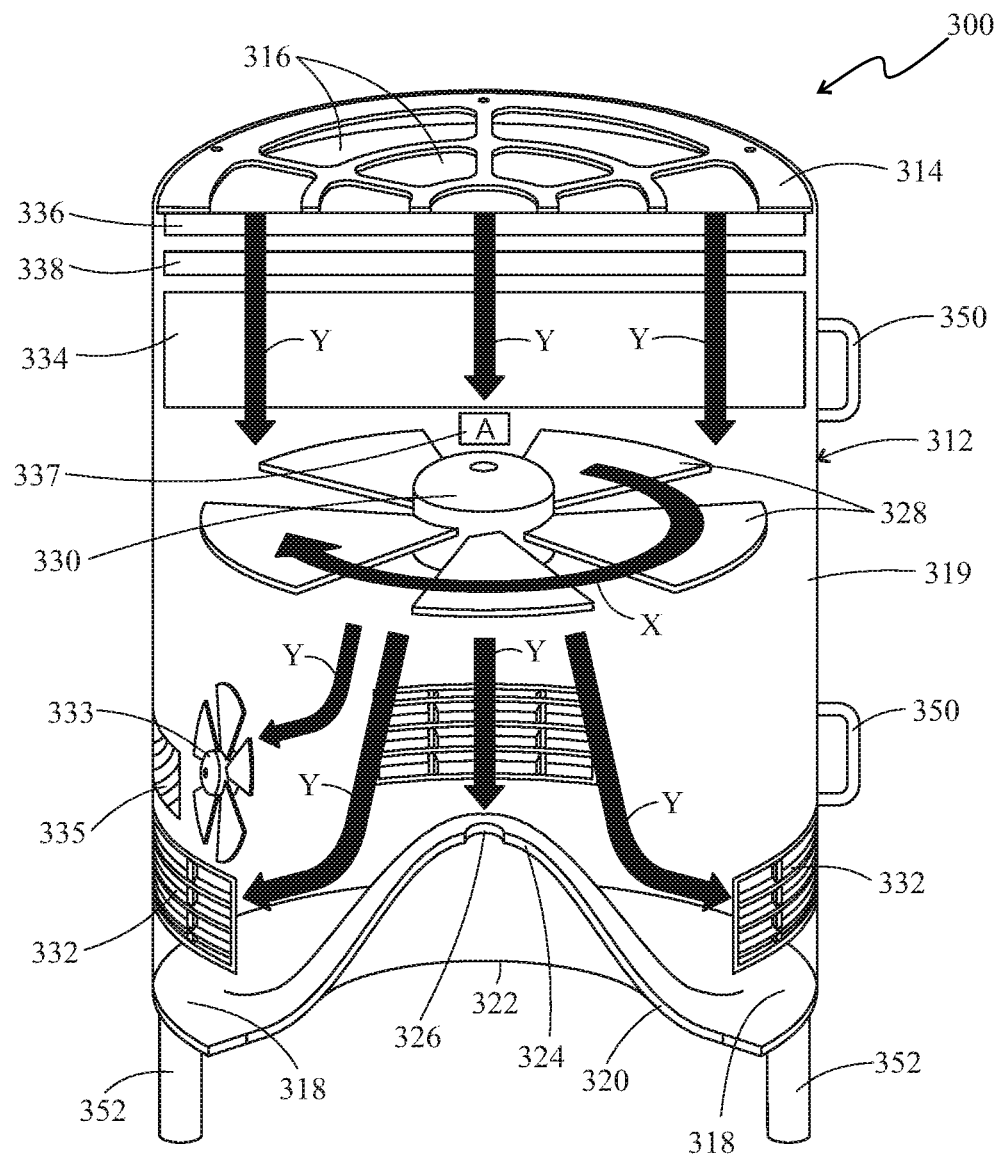
FIG. 9 is a cut away perspective view of the air circulation and purification device shown in FIG. 8 showing internal components of the device.

A cut away perspective view of the air circulation and purification device 300 shown in FIG. 8 showing internal components of the device is depicted in FIG. 9. As shown in FIG. 9, housing 312 of device 300 includes a conical shaped portion 320 extending inward from the bottom 318 of housing 312 with the conical shaped portion 320 having a wide open end 322 and a narrower closed end 324. The narrow closed end 324 of conical shaped portion 320 of housing 312 may or may not include an opening 326. Device 300 includes plurality of blades 328 in communication with a motor 330, all contained within housing 312, for moving the plurality of blades 328 within the housing 312. The motor and plurality of blades may take the form of a fan and both a plurality of blades in communication with a motor and a fan are meant to be used interchangeably throughout the description of the embodiments of the invention. When the motor 330 moves the plurality of blades 328 within the housing 312, air is forced to move downward in a three hundred sixty-degree direction around the conical shaped portion 320 of the housing 312 to enable a high volume of air to be expelled through housing 312 and through air output vents 332 and circulated back to opening(s) 316 in top 314 of housing 312 which function as air intake opening(s) for the device 300. The rotation direction of blade members 328 are shown by arrow X and air flow through the device is shown by arrows Y. Housing 312 may also include additional structural elements (not shown) within housing 312 for directing air flow within the device 300 toward the blades 328 and motor 330 (or fan) contained within the device 300.

Device 300 may also include a fan 333 (and in the case where blades 328 and motor 330 are referred to as a fan, this fan 333 is a second fan) contained within housing 312 located between blades 328 and motor 330 (first fan) and bottom 318 of housing 312 and an exhaust vent 335 contained within a side 319 of housing 312 located near fan 333 to create a negative pressure within an area in which the device is operating. This negative pressure assists in keeping contaminated air from moving into other areas or other parts of a building thereby enabling device 300 to more quickly and efficiently purify any contaminated air. Device 300 may also include an anemometer 337 mounted within housing 312 for measuring the speed and/or volume of air moving through the housing 312.

Device 300 may also include one or more filters within housing 312 thereby making it an air purification device in addition to an air circulation device. Device 300 used without filters functions as an air circulation device without filtration/purification which is particularly useful in renovation and restoration when wet areas and structures need to be dried. In addition, heaters or heating devices can be attached to output vents 332 of housing 312 or can be connected to device 300 by plugging them into GFCI outlet 342. When also functioning as a filtration/purification unit, device 300 includes one or more filters such as a high efficiency particulate air (HEPA) filter. As shown in FIG. 9, HEPA filter 334 is contained within housing 312 and located between the top 314 of housing 312 and the plurality of blades 328 and motor 330 contained within housing 312. One or more additional filters may also be included within housing 312 to pre-filter large sized contaminants from the air before the air enters the HEPA filter 334 contained within housing 312. For example, as shown in FIG. 9, a first pre-filter 336 is contained within housing 312 and located above the HEPA filter 334 and a second pre-filter 338 is contained within housing 312 and located between first pre-filter 336 and the HEPA filter 334. Further, as previously described above with reference to device 10, many types of filters may be included within housing 312 of device 300 to further filter/purify contaminated air including the removal/elimination of odor from contaminated air.

Figure 10:
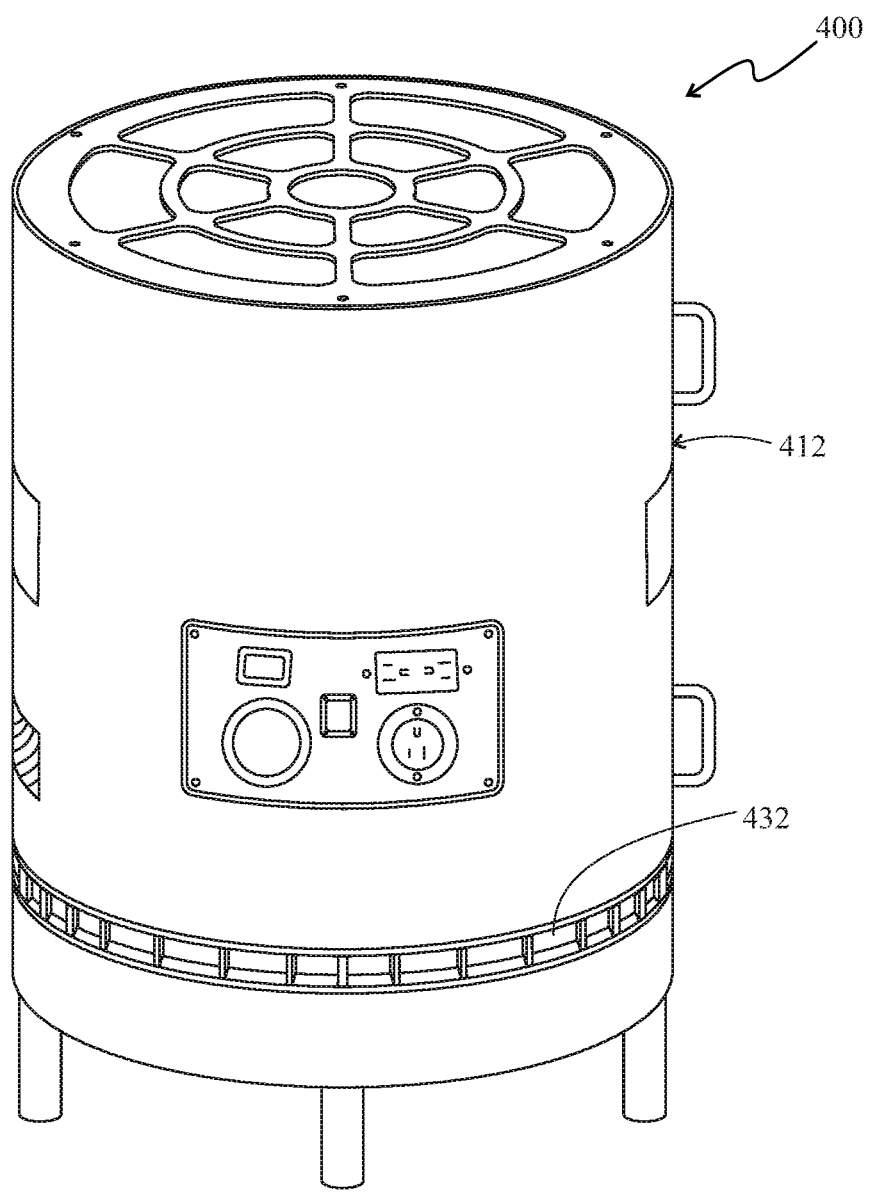
FIG. 10 is a perspective view of yet another exemplary embodiment of an air circulation and purification device in accordance with the present invention.

FIG. 10 is a perspective view of yet another exemplary embodiment of an air circulation and purification device 400 in accordance with the present invention. Outwardly, device 400 is the same as device 300 except that instead of multiple air output vents 332, a slit 432 is contained around and through the outer circumference of housing 412 near the bottom of housing 412. This slit 432 functions as an air output vent that expels filtered air from the interior of the housing in a 360-degree direction about the outer circumference of the housing. This 360-degree air flow of filtered air provides for increased circulation of filtered air back to the capture zone which results in faster and more efficient air purification.

Figure 11:
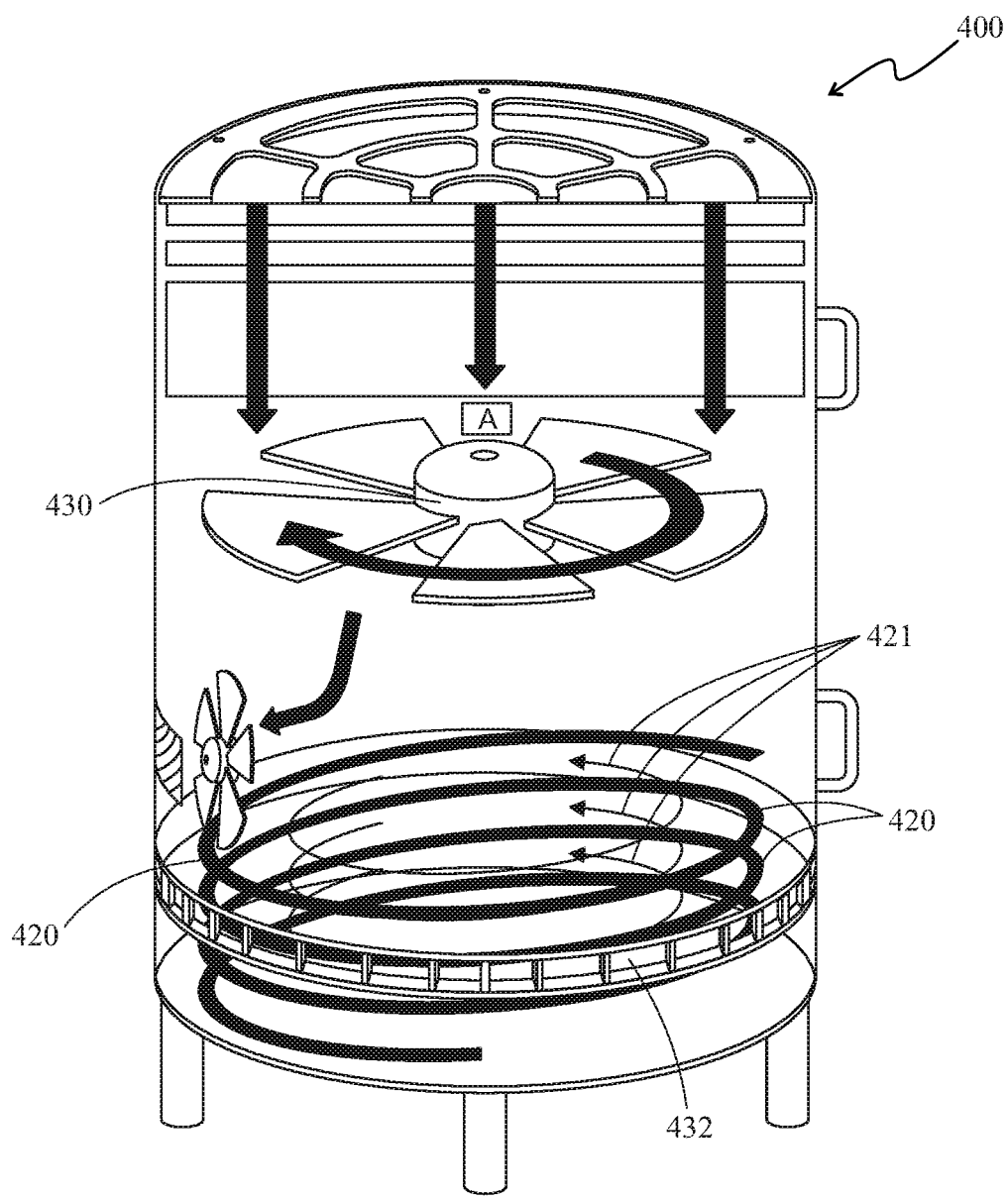
FIG. 11 is a partial cut away perspective view of the air circulation and purification device shown in FIG. 10 showing internal elements contained within the housing.

A partial cut away perspective view of the air circulation and purification device shown in FIG. 10 showing internal elements contained within the housing is shown in FIG. 11. Inwardly, device 400 is the same as device 300 except that instead of conical shaped portion 320 extending inward from the bottom of the housing 412, there is a helical element 420 that forms a spiral within the lower portion of housing 412 to deflect the air flow so that the filtered air flows in a downward circular direction as shown by arrows 421. This same air flow could also be achieved with other structural elements such as, for example several blade members that are positioned in the interior of the housing 412 that curve downward to either the left of the right thereby forcing the air into a vortex style flow. A free spinning fan blade contained below the fan 430 could also be used to deflect the filtered air into a downward circular direction. The filtered air then flows through slit 432 in a 360-degree direction to maximize the circulation of filtered air back to the capture zone.

Multidirectional flow of filtered air from the device back to the capture zone provides for a more efficient and effective air circulation and purification device. Filtered air exits the device in multiple directions which then hits the walls in a contained room or area. The filtered air then travels up the walls to the ceiling and then circulates to the capture zone of the device. All of the air output vents (as well as the slit shown in FIGS. 10 and 11) in the above described exemplary embodiments may take the form of closeable vents which a user of the device to further direct or focus the flow of filtered air being expelled from the device. All of the above described exemplary embodiments may also include a dehumidifier and/or a heater. A heater may be attached to an exhaust portion of a dehumidifier such that the heater is activated if the surrounding temperature decreases to a set predetermined temperature. In addition, two or more devices of the present invention may be placed side by side to increase air circulation. In the case where two or more devices are placed side by side, the presence of closeable air output vents in the devices will enable a user to maximize the efficiency of the air flow and circulation by closing off vents that would not maximize return of filtered air to the capture zone.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The detailed description of exemplary embodiments of the invention herein shows various exemplary embodiments of the invention. These exemplary embodiments and modes are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent modes or embodiments that are known or obvious to those reasonably skilled in the art. Additionally, all included examples are non-limiting illustrations of the exemplary embodiments and modes, which similarly avail themselves to any equivalent modes or embodiments that are known or obvious to those reasonably skilled in the art.

Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters, or other operating requirements without departing from the scope of the instant invention and are intended to be included in this disclosure.

Unless specifically noted, it is the Applicant's intent that the words and phrases in the specification and the claims be given the commonly accepted generic meaning or an ordinary and accustomed meaning used by those of ordinary skill in the applicable arts. In the instance where these meanings differ, the words and phrases in the specification and the claims should be given the broadest possible, generic meaning. If any other special meaning is intended for any word or phrase, the specification will clearly state and define the special meaning.

The invention claimed is:
1. An air circulating device comprising:
  a housing having a top with at least one opening therein and a bottom with a conical shaped portion extending inward from the bottom of the housing with the conical shaped portion having a wide lower open end and a narrower upper end;

a plurality of blades contained within the housing, wherein the plurality of blades are positioned near the bottom of the housing and directly above the conical shaped portion of the bottom of the housing;

a motor contained within the housing for moving the plurality of blades;

at least one support member extending from and along at least a portion of a side of the housing near the top of the housing to support the device when the device is placed on its side; and a plurality of air output vents contained within the side of the housing near the bottom of the housing and below the plurality of blades contained within the housing such that air expelled through the plurality of air output vents is expelled in at least two different directions.

2. The air circulating device of claim 1 further comprising a high efficiency particulate air (HEPA) filter contained within the housing near the top of the housing.

3. The air circulating device of claim 2 further comprising a first pre-filter contained within the housing located above the HEPA filter.

4. The air circulating device of claim 3 further comprising a second pre-filter contained within the housing located between the first pre-filter and the HEPA filter.

5. The air circulating device of claim 1 wherein the side of the housing comprises four square shaped or rectangular shaped sides with at least one of the plurality of air output vents contained within each of the four sides to enable air to be expelled from the device in four different directions.

6. The air circulating device of claim 1 wherein the side of the housing comprises a cylindrical shape having the plurality of air output vents positioned about a circumference of the cylindrical shape to enable air to be expelled from the device in four different directions.

7. The air circulating device of claim 1 wherein the narrow upper end of the conical shaped portion of the housing has an opening therethrough.

8. The air circulating device of claim 1 further comprising a power inlet for connecting a source of power to the air circulating device.

9. The air circulating device of claim 1 further comprising a ground-fault circuit interrupter (GFCI) outlet for connecting other pieces of equipment to the air circulating device and for shutting off power to the air circulating device in the event of a ground-fault.

10. The air circulating device of claim 1 further comprising an on/off switch.

11. The air circulating device of claim 1 further comprising a timer for at least one of recording and displaying a total amount of time the device has been operating during its lifetime and setting an amount of time for the device to remain operating during a single use of the device.

12. The air circulating device of claim 1 further comprising a control element for varying the speed at which the plurality of blades are moving.

13. The air circulating device of claim 12 wherein the control element automatically varies the speed at which the blades are moving to maintain a consistent air flow volume through the device.

14. The air circulating device of claim 1 wherein the housing further comprises at least one handle member.

15. The air circulating device of claim 1, wherein the side includes an upper portion and a lower portion, wherein the lower portion of the side includes the plurality of air output vents and is removable from the rest of the device.

16. The air circulating device of claim 1 further comprising a plurality of foot members and/or wheels extending outward from the bottom of the housing near an outer perimeter of the bottom of the housing.

17. The air circulating device of claim 1 further comprising an anemometer mounted within the housing for measuring at least one of a speed and a volume of air moving through the housing.

18. The air circulating device of claim 1 further comprising at least one indentation contained within a horizontal length of the device that is located opposite the at least one support member.

19. An air circulating device comprising:

a housing having a top with at least one opening therein, a bottom with a conical shaped portion extending upward from the bottom of the housing with the conical shaped portion having a wide lower open end and a narrower upper end, and a plurality of sides located between the top and the bottom of the housing;

a plurality of air output vents contained within the plurality of sides of the housing;

a plurality of blades contained within the housing wherein the blades are positioned near the bottom of the housing above the plurality of air output vents contained within the plurality of sides of the housing and directly above the conical shaped portion of the bottom of the housing; and a motor contained within the housing for moving the plurality of blades.

20. The air circulating device of claim 19 wherein the bottom of the housing and a portion of the plurality of sides of the housing containing the plurality of air output vents located beneath the plurality of blades are removable from the rest of device.

21. The air circulating device of claim 20 wherein the top of the housing is removable.

22. The air circulating device of claim 19 wherein the housing further comprises at least one support member extending from and along at least a portion of at least one of the plurality of sides of the housing and at least one handle.

* * * * *